No. 663,899. Patented Dec. 18, 1900.
W. HOLMES.
VEHICLE TIRE FASTENING.
(Application filed Aug. 13, 1900.)
(No Model.)
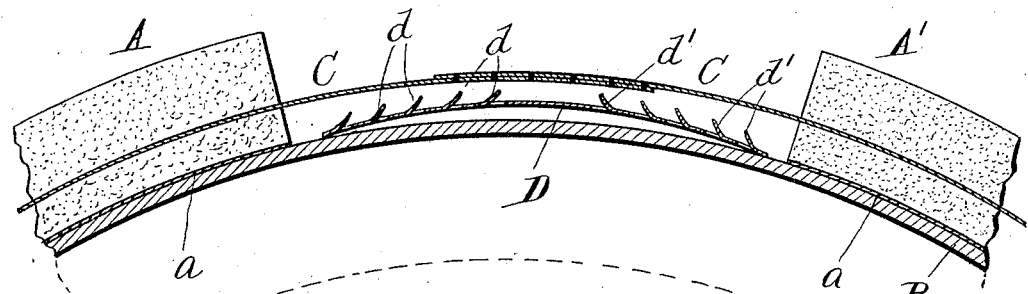
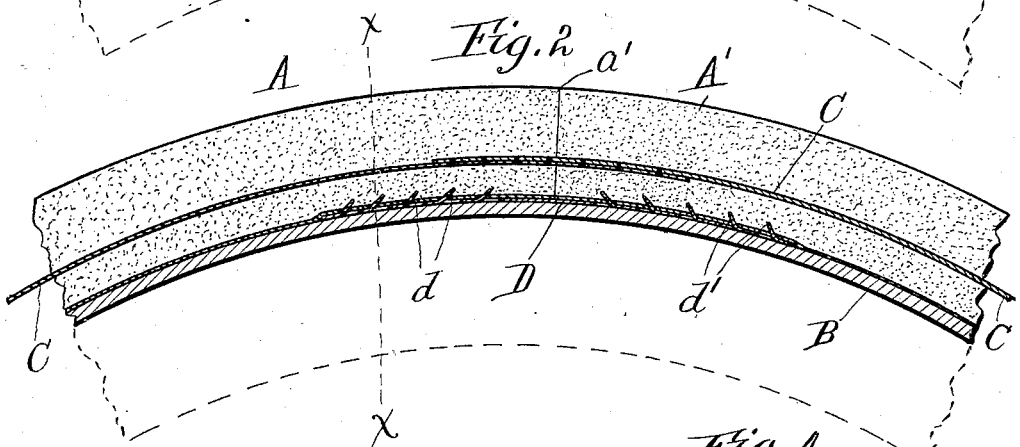
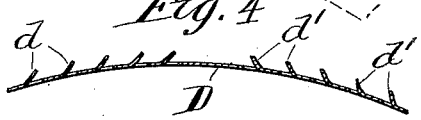
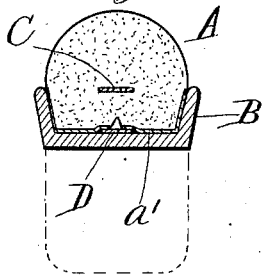
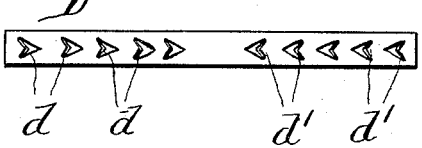
Witnesses:
A. F. Durand
A. G. Olsen
Inventor:
William Holmes
by Chas. G. Page
Attorney.

UNITED STATES PATENT OFFICE.

WILLIAM HOLMES, OF CHICAGO, ILLINOIS, ASSIGNOR TO THE MORGAN & WRIGHT, OF SAME PLACE.

VEHICLE-TIRE FASTENING.

SPECIFICATION forming part of Letters Patent No. 663,899, dated December 18, 1900.

Application filed August 13, 1900. Serial No. 26,725. (No model.)

*To all whom it may concern:*

Be it known that I, WILLIAM HOLMES, a citizen of the United States, residing at Chicago, county of Cook, State of Illinois, have invented certain new and useful Improvements in Vehicle Tire Fastening Devices, of which the following is a specification.

My invention relates to elastic vehicle-tires of that class in which the rubber or rubber composition portion of the tire, with or without a reinforcement of fabric, is either molded to form a length suitable for a tire or molded to form a piece sufficiently long to permit it to be cut up into a number of lengths suitable for a like number of tires. A tire length thus formed is usually placed within the channel of a wheel-rim and provided with one or more bands or wires generally fastened together at their ends while the tire is seated in the rim-channel, the adjacent end portions of the tire in such case being temporarily forced back upon the band or bands, so as to permit the ends of such band or bands to be secured together. After the ends of these binding devices have been thus secured together the end portions of the tire are caused to come together and meet, thereby forming a joint in the tire. As an illustration of this mode of securing a tire in a channeled rim, reference may be made to Letters Patent of the United States No. 604,067, dated May 17, 1898, to F. W. Morgan, in which patent a single fastening-band consisting of a strip of metal is shown. While the rubber tires such as described in said patent are made of such length that they will be under longitudinal compression even after their ends have been brought together, the rubber will in time tend to set and during use the tire will frequently open at the butt-joint formed between its abutting ends—that is to say, its edge will separate, so as to form in the tire a gap, into which dirt or gravel will crowd, and under such conditions further use of the tire will tend to cause further crowding of matters into the gap and hence widen the same.

The object of my invention is to provide a cheap simple device which can be readily applied for the purpose of tying together the abutting ends of the tire, so as to avoid any material separation of the meeting end portions of the tire and consequent opening of the tire at the joint.

My invention can also be applied to a tire formed of several lengths or portions.

To the attainment of the foregoing and other useful ends my invention consists in matters hereinafter set forth.

In the accompanying drawings, Figure 1 is a section taken centrally and longitudinally through a portion of a tire and wheel-rim with the end portions of the tire pushed back and a toothed tie strip or plate embodying the principles of my invention placed upon the bottom of the channel in the rim between the end portions of the tire preparatory to bringing such end portions of the tire together. Fig. 2 is a like view showing the end portions of the tire brought together and tied in accordance with the principles of my invention. Fig. 3 is a section taken through Fig. 2 on line *x x*. Fig. 4 shows a toothed tie strip or plate embodying the principles of my invention normally curved or bowed. Fig. 5 is a plan view of the toothed tie strip or plate and illustrates the spurs or teeth made integral with a strip or plate by punching the latter.

A A' indicate the end portions of a substantially solid elastic tire molded with a strip of one or more layers of fabric along its base portion, as at *a*. The tire shown is of ordinary construction, as is also the rim B, provided with a channel in which the tire is seated and held. The tire can be held on the rim by one or more bands or wires, as usual, the drawings showing a single flat metal band C inserted longitudinally through the tire. On Fig. 1 the end portions of the tire are shown pushed back and compressed, so as to allow the lapping ends of the band to be riveted together. In Fig. 2 the end portions of the tire are brought together, thereby forming a cross seam or joint *a'*, Fig. 2.

My invention contemplates a tie strip or plate having two sets of spurs or teeth adapted to penetrate and engage in the tire at opposite sides of the joint which is crossed by the strip or plate, the teeth of each set being inclined toward a point between the two sets, in which way by applying the toothed tie strip or plate before the end portions of the tire are brought together, so that the two sets of teeth shall be between the terminals of such end portions of the tire, said end portions can be brought together, since they will yield to and not catch upon the inclined spurs or teeth. When, however, the end portions of the tire meet, any tendency on their part to separate will cause them to catch upon the teeth or spurs of the tie strip or band, which therefore will tie such end portions of the tire together and prevent the joint from opening. Moreover, after bringing the end portions of the tire together they can be relatively crowded or compressed toward the joint, so that when released they will spring back to an extent to cause an effective penetration of the spur or teeth in the tire.

Broadly considered, the tie band or strip, which is a spring-strip having a normal curvature on a different radius from the radius of the circle described by the rim or tire thereon, for purposes hereinafter described, may be curved the reverse of the curvature shown and applied in an opening or channel in the tire; but as a preferred arrangement and matter of further improvement I place the toothed tie strip or plate D in the channel between the separated ends of the tire, as in Fig. 1, and then bring such ends or end portions together, as in Fig. 2, where they are shown held together by the toothed tie band or strip. This tie band or strip does not normally conform to the curvature of the base of the tire or the base or bottom of the annular channel in the rim, but is a spring-metal strip made on a curve having a radius different from the radius of the circle on which the channel-base is formed, as in Fig. 1. When, therefore, the end portions of the tire are brought together, as in Fig. 2, the band will be bent or flexed to conform with the circle on which the channel or the base is formed, and, hence will be under spring tension, tending to maintain its teeth $d\ d'$, firmly embedded in the base of the tire. As best illustrated in Fig. 1, the toothed spring tie-strip is normally on the line of a curve or circle of less radius than the radius of the circle on which the bottom of the rim-channel is formed as a matter of special and preferred arrangement. When, therefore, the ends of the tire are brought together, as in Fig. 2, the normally-bowed tie-strip will be straightened out to an extent to cause it to conform to the greater radius of the wheel-rim. A further advantage of this application and arrangement is that the tire-base being molded with a stout fabric surface the spurs or teeth of the tie band or strip will engage in such fabric, which will not yield or tear, as would the rubber, in case the teeth only engaged the rubber material. Where the tire is made of two or more lengths or portions forming a plurality of joints, a toothed tie-band can be provided for each joint.

What I claim as my invention is—

1. The combination with a substantially solid elastic tire seated within a channeled rim and involving a joint at its meeting end portions; and a device adapted for tying together such end portions of the tire to prevent material opening or separation of the tire at the joint, and comprising a spring tie strip or plate normally bowed on substantially the line of a circle having a radius different from the radius of the circle of the tire, and having two sets of spurs or teeth respectively at opposite sides of the joint of the tire and inclining toward such joint, said spurs or teeth being in engagement with the tire and the spring strip or plate being flexed from its normal curvature to place it under tension and thereby assist in maintaining its spurs or teeth in engagement with the tire.

2. The combination of a substantially solid elastic tire seated within a channeled rim and involving a joint between its meeting end portions; and a device adapted for tying together such end portions of the tire to prevent material opening or separation of the tire at the joint, and comprising a spring tie strip or plate normally on a different longitudinal curve from the longitudinal curve of the tire and base of the rim-channel and confined between the base of the tire and the base of the channel, said tire-strip being arranged to cross the tie-joint and having two sets of spurs or teeth inclined toward the joint and engaging in the base of the tire; the spring tie-strip being flexed to substantially conform to the curve of the tire-base and channel-base, and being thereby under tension.

3. The combination of a substantially solid elastic tire seated within a channeled rim and involving a joint between its meeting end portions; and a device adapted for tying together such end portions of the tire to prevent material opening or separation of the tire at the joint, and comprising a spring tie strip or plate normally on a curve having a radius which is less than the radius of the circle on which the base of the rim-channel is formed, said spring tie strip or plate being confined between the base of the tire and the base of the channel and arranged to cross the joint and having two sets of spurs or teeth inclined toward the joint and engaging in the base of the tire; the spring tie strip or plate being also flexed or straightened in opposition to its inherent spring resistance to an extent to substantially conform to the curvature of the base of the tire and bottom of the rim-channel and being thereby under tension.

WILLIAM HOLMES.

Witnesses:
CHARLES G. PAGE,
ARTHUR G. OLSEN.